United States Patent Office 3,564,024
Patented Feb. 16, 1971

3,564,024
2-METHOXY-5-METHYL-6-MULTIPRENYL-1,4-BENZOQUINONES
Karl Folkers and Glenn Doyle Daves, Jr., Menlo Park, Calif., assignors, by mesne assignments, to Merck & Co., Inc., Rahway, N.J., a corporation of New Jersey
No Drawing. Filed June 28, 1966, Ser. No. 561,017
Int. Cl. C07c 49/64
U.S. Cl. 260—396                                6 Claims

ABSTRACT OF THE DISCLOSURE 2-methoxy-5 - methyl - 6 - multiprenyl - 1,4 - benzoquinones are prepared by the acid-catalyzed condensation of 2-methoxy-5-methylbenzoquinone with an isoprenoid alcohol. The products are useful as intermediates in the microbiological synthesis of coenzyme Q compounds.

---

This invention relates to methoxy derivatives of multiprenyl-1,4-benzoquinones. More particularly, it is concerned with 2-methoxy-5-methyl - 6 - multiprenyl - 1,4-benzoquinones and processes for their synthesis from 2-methoxy-5-methyl-1,4 - benzoquinone and various isoprenoid alcohols.

The 2-methoxy-5-methyl-6 - multiprenyl - 1,4 - benzoquinones obtained in accordance with this invention are useful as intermediates in the microbiological biosynthesis of corresponding coenzyme Q's, compounds possessing important biological and therapeutic properties.

By this invention 2 - methoxy - 5-methyl-1,4-benzoquinone can be converted to 6-multiprenyl derivatives by reaction of its corresponding hydroquinone with an appropriate polyisoprenoid alcohol in the presence of an acid catalyst. The reaction can be shown as follows:

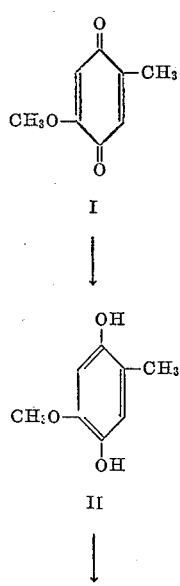

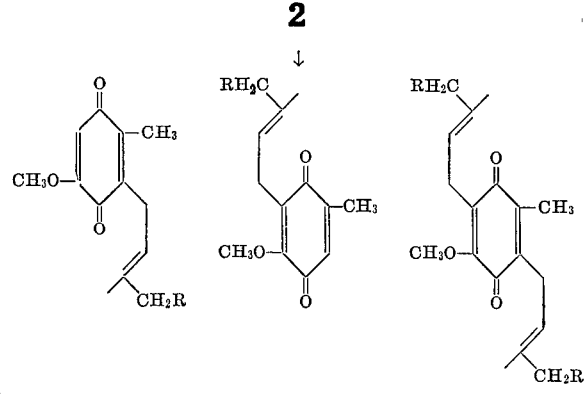

wherein R represents

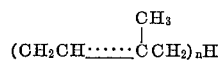

where the double bond represented by the dotted line can also be saturated with hydrogen, and $n$ represents an integer from 0 to 9.

The procedure consists of acid-catalyzed condensation of the hydroquinone (II) corresponding to 2-methoxy-5 - methylbenzoquinone (I) with an appropriate isoprenoid alcohol followed by thin layer chromatographic separation of the desired product (III) from the by-products, IV and V. The structures followed from an examination of the spectra (UV, see Table I; NMR, see Table II) of the isolated products.

Comparison of the ultraviolet spectra of the synthetic products with known models provides support for the assigned structures. Compounds of general structure III showed $$\lambda_{max.}^{hexane}$$

at 265 and 272 (273) m$\mu$ (Table I). The model, 2-methoxy-5,6-dimethylbenzoquinone, exhibits corresponding maxima at 266 and 272 m$\mu$. The isomeric series (IV) showed $$\lambda_{max.}^{hexane}$$

at 262 (260) m$\mu$; the corresponding model, 2-methoxy-3,6-dimethylbenzoquinone, has a maximum at 262 m$\mu$. And finally the bis-multiprenyl series (V) show $$\lambda_{max.}^{hexane}$$

at 269 m$\mu$ with a shoulder at 275 m$\mu$; 2-methoxy-3,5,6-trimethylbenzoquinone shows $$\lambda_{max.}^{hexane}$$

at 268 m$\mu$.

Confirmation of these structures was provided by examination of the NMR spectra (Table II). The bismultiprenyl compounds (V) were readily detected by the absence of a ring proton absorption in the region $\tau$ 3.5–4.5. The remaining two series of compounds showed ring proton absorptions at $\tau$ 4.3 (singlet) for III, and at $\tau$ 3.7 (quartet) for IV. It is clear that this ring proton quartet is due to long range coupling of the proton at C–6 with the protons of the C–5 methyl substituent. Examination of the NMR spectrum of 2-methoxy-5-methylbenzoquinone (I) reveals an identical situation. One ring proton appears at $\tau$ 3.5 as a quartet and is assigned as the C–6 proton. This proton is coupled with the methyl group at C–5 which appears as a doublet (J~1 c.p.s.) at $\tau$ 7.97. The C–3 proton appears as a singlet at $\tau$ 4.13; the methoxyl singlet occurs at $\tau$ 6.23.

TABLE I.—UV DATA $\lambda_{max.}^{hexane}$, m$\mu$

| | III | IV | V |
|---|---|---|---|
| Geranyl | 265, 273 | 262 | 269, 275 (s).[1] |
| Farnesyl | 265, 273 | 262 | 269, 275 (s).[1] |
| Solanesyl | 265, 272 | 262 | |
| Decaprenyl | 265, 272 | 260 | |
| Phytyl | 265, 272 | 262 | 269, 275 (s).[1] |

[1] (s)=shoulder.

TABLE II.—NMR DATA [1]

| | R | Ring proton | Vinyl | Methoxyl | Benzylic | Alkyl |
|---|---|---|---|---|---|---|
| III | Geranyl | 4.32 (s) | 5.16 (m) | 6.30 (s) | 6.91 (d) | 7.8–8.6 (m) |
| | Farnesyl | 4.28 (s) | 5.04 (m) | 6.27 (s) | 6.87 (d) | 7.8–8.6 (m) |
| | Solanesyl | 4.29 (s) | 4.98 (m) | 6.27 (s) | 6.87 (d) | 7.8–8.5 (m) |
| | Decaprenyl | 4.31 (s) | 4.99 (m) | 6.27 (s) | 6.87 (d) | 7.8–8.5 (m) |
| | Phytyl | 4.31 (s) | 5.14 (t) | 6.29 (s) | 6.89 (d) | 7.8–9.3 (m) |
| IV | Geranyl | 3.71 (q) | 5.06 (m) | 6.05 (s) | 6.96 (d) | 7.8–8.6 (m) |
| | Farnesyl | 3.71 (q) | 5.04 (m) | 6.04 (s) | 6.95 (d) | 7.8–8.6 (m) |
| | Solanesyl | 3.73 (q) | 4.99 (m) | 6.04 (s) | 6.96 (d) | 7.8–8.6 (m) |
| | Decaprenyl | 3.71 (q) | 4.98 (m) | 6.03 (s) | 6.95 (d) | 7.8–8.6 (m) |
| | Phytyl | 3.71 (q) | 5.05 (t) | 6.02 (s) | 6.95 (d) | 7.8–9.3 (m) |
| V | Geranyl | | 5.08 (m) | 6.07 (s) | 6.94 (m) | 7.8–8.6 (m) |
| | Farnesyl | | 5.07 (m) | 6.07 (s) | 6.93 (m) | 7.8–8.6 (m) |
| | Phytyl | | 5.08 (m) | 6.07 (s) | 6.93 (m) | 7.8–9.3 (m) |

[1] Spectra were obtained using carbon tetrachloride solutions with a Varian Associates HR 100 spectrometer. Values are in $\tau$ units. The letters in parentheses refer to peak shape: s=singlet, d=doublet, t=triplet, q=quartet, m=multiplet.

The following examples illustrate specific methods of carrying out the various processes of the present invention.

EXAMPLE 1

Isoprenylation of 2-methoxy-5-methylbenzoquinone

General procedure: An ether solution of 1.52 g. (0.01 mole) of 2-methoxy-5-methylbenzoquinone is shaken in a separatory funnel with an aqueous solution of 10 g. of sodium hydrosulfite until the organic phase is essentially colorless. The organic phase is separated and the solvent removed. To the residue is added 0.003 mole of the appropriate isoprenoid alcohol in 75 ml. of freshly distilled dioxane. To the resulting, well stirred solution is added dropwise 1.5 ml. of redistilled borontrifluoride etherate. After 3 hours, the reaction mixture is poured into a mixture of 3 volumes of ether and 3 volumes of water. The organic phase is removed and shaken in a separatory funnel with 150 ml. of water:methanol (2:1) containing an excess (10–15 g.) of ferric chloride hexahydrate. The organic phase is separated and dried over magnesium sulfate. The residue obtained upon removal of the solvent is triturated with 15–25 ml. of hexane. The insoluble material (recovered 2-methoxy-5-methylbenzoquinone) is removed and the hexane-soluble residue is subjected to preparative thin layer chromatography on silica gel G plates developed in chloroform:benzene (1:1). After development, the plates show 4 distinct yellow to orange bands. Elution of these bands yields in order, from the origin) recovered 2-methoxy-5-methylbenzoquinone (I), 2-methoxy-5-methyl-6-multiprenylbenzoquinone (III), 2-methoxy-3-multiprenyl-5-methylbenzoquinone (IV), and 2-methoxy-3,6-bis-multiprenylbenzoquinone (V), respectively. In each case, a second purification by the same procedure is necessary to obtain a pure sample of the desired 2 - methoxy - 5 - methyl-6-multiprenylbenzoquinone (III).

EXAMPLE 2

2-methoxy-5-methyl-6-geranyl-1,4-benzoquinone

By the general procedure described in Example 1, 2-methoxy-5-methyl-6-geranyl-1,4-benzoquinone is prepared by reacting 2-methoxy-5-methyl-1,4-hydroquinone with geraniol and characterized by the properties described in Tables I and II.

EXAMPLE 3

2-methoxy-5-methyl-6-farnesyl-1,4-benzoquinone

By the general procedure described in Example 1, 2-methoxy - 5 - methyl-6-farnesyl-1,4-benzoquinone is prepared by reacting 2-methoxy-5-methyl-1,4-hydroquinone with farnesol and characterized by the properties described in Tables I and II.

EXAMPLE 4

2-methoxy-5-methyl-6-solanesyl-1,4-benzoquinone

By the general procedure described in Example 1, 2-methoxy - 5 - methyl-6-solanesyl-1,4-benzoquinone is prepared by reacting 2-methoxy-5-methyl-1,4-hydroquinone with solanesol and characterized by the properties described in Tables I and II.

EXAMPLE 5

2-methoxy-5-methyl-6-decaprenyl-1,4-benzoquinone

By the general procedure described in Example 1, 2-methoxy-5-methyl-6-decaprenyl-1,4-benzoquinone is prepared by reacting 2-methoxy-5-methyl-1,4-hydroquinone with decaprenyl alcohol and characterized by the properties described in Tables I and II.

EXAMPLE 6

2-methoxy-5-methyl-6-phytyl-1,4-benzoquinone

By the general procedure described in Example 1, 2-methoxy-5-methyl-6-phytyl-1,4-benzoquinone is prepared by reacting 2-methoxy-5-methyl-1,4-hydroquinone with phytol.

What is claimed is:
1. A compound of the formula

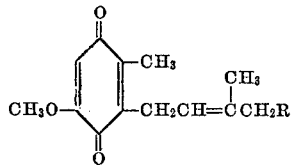

wherein R represents

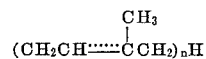

where the double bond shown by the dotted line can be unsaturated or saturated with hydrogen, and $n$ represents an integer from 0 to 9.

2. A compound according to claim 1 which is 2-methoxy-5-methyl-6-geranyl-1,4-benzoquinone.
3. A compound according to claim 1 which is 2-methoxy-5-methyl-6-farnesyl-1,4-benzoquinone.
4. A compound according to claim 1 which is 2-methoxy-5-methyl-6-solanesyl-1,4-benzoquinone.
5. A compound according to claim 1 which is 2-methoxy-5-methyl-6-decaprenyl-1,4-benzoquinone.
6. A compound according to claim 1 which is 2-methoxy-5-methyl-6-phytyl-1,4-benzoquinone.

References Cited

UNITED STATES PATENTS 3,118,914  1/1964  Gloor et al. _____ 260—396

LORRAINE A. WEINBERGER, Primary Examiner

L. A. THAXTON, Assistant Examiner

U.S. Cl. X.R.

260—613